United States Patent
Yamamoto et al.

(10) Patent No.: US 7,134,734 B2
(45) Date of Patent: Nov. 14, 2006

(54) SHAFT FOR ROLLER WHEEL

(75) Inventors: Teiji Yamamoto, Hirakata (JP); Kenji Kooriyama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/797,559

(22) Filed: Mar. 11, 2004

(65) Prior Publication Data

US 2005/0040705 A1    Feb. 24, 2005

(30) Foreign Application Priority Data

Mar. 14, 2003   (JP) .............................. 2003-069322

(51) Int. Cl.
*B60B 19/00* (2006.01)
*B60C 7/00* (2006.01)

(52) U.S. Cl. ...................... 305/119; 305/136

(58) Field of Classification Search ................ 305/119, 305/136–138, 117, 124, 129, 142, 199; 295/36.1
See application file for complete search history.

(56) References Cited

U.S. PATENT DOCUMENTS

| | | | | |
|---|---|---|---|---|
| 3,147,048 A | * | 9/1964 | Hampus et al. ............. | 384/584 |
| 3,910,128 A | * | 10/1975 | Boggs et al. ............... | 474/151 |
| 4,095,450 A | * | 6/1978 | Opland et al. ............... | 72/318 |
| 4,152,031 A | * | 5/1979 | Maguire ..................... | 305/119 |
| 4,209,205 A | * | 6/1980 | Gregg et al. ................ | 305/119 |
| 4,815,794 A | * | 3/1989 | Becker et al. .............. | 305/119 |
| 5,288,143 A | * | 2/1994 | Dester et al. ............... | 305/137 |
| 5,803,558 A | * | 9/1998 | Ketting et al. .............. | 305/136 |
| 6,851,768 B1 | * | 2/2005 | Takeno et al. .............. | 305/136 |

FOREIGN PATENT DOCUMENTS

JP         05-45338        6/1993

* cited by examiner

*Primary Examiner*—Jason R. Bellinger
(74) *Attorney, Agent, or Firm*—Armstrong, Kratz, Quintos, Hanson & Brooks, LLP

(57) ABSTRACT

The invention provides a shaft for a roller wheel which is excellent in strength and can achieve a weight saving. The invention provides a shaft for a roller wheel which rotatably supports a roller (3) outward fitted between both end portions (5a, 5b) in a state in which both end portions (5a, 5b) are fixed, and receives a load in a diametrical direction via the roller (3). Recess portions (6, 6) are provided on a side to which the load is not applied, on an outer peripheral surface corresponding to the roller (3). The load applying direction is a vertical direction. A cross sectional shape of the shaft in the recess portions (6, 6) is formed in a shape which is constituted by an upper circular arc portion (10) on an upper side, a lower circular arc portion (11) on a lower side, and a vertical connection portion (12) passing through a shaft axis (O) and connecting the upper circular arc portion (10) to the lower circular arc portion (11).

3 Claims, 13 Drawing Sheets

SHAFT FOR ROLLER WHEEL

BACKGROUND OF THE INVENTION

1. Field of the Invention

The present invention relates to a shaft for a roller wheel which is used in a roller wheel of a crawler type traveling apparatus or the like.

2. Description of the Prior Art

As shown in FIG. 15, there has been conventionally a crawler type traveling apparatus (a chassis apparatus) structured such that a frame 101, an idler 102 and a sprocket 103 are arranged approximately linearly, a plurality of lower roller wheels 104, . . . are rotatably provided in a lower portion of the frame 101, and a crawler belt 105 is wound around the idler 102, the lower roller wheels 104, . . . and the sprocket 103. The lower roller wheels 104 are structured such as to disperse a weight of a vehicle body and transmit to the crawler belt 105.

In this case, the lower roller wheel 104 is provided with a shaft 106, and a roller 107 rotatably supported to the shaft 106, for example, as shown in FIG. 16. The shaft 106 is constituted by a first shaft portion 108a and a second shaft portion 108b, and the first shaft portion 108a and the second shaft portion 108b are integrally welded. In other words, the respective shaft portions 108a and 108b are constituted by large-diameter main body portions 109a and 109b, and supporting portions 110a and 110b continuously provided in the main body portions 109a and 109b, and hole portions 111a and 111b are provided in the main body portions 109a and 109b. Further, the main body portion 109a of the first shaft portion 108a and the main body portion 109b of the second shaft portion 108b are integrated in an abutted state. Further, the roller 107 is rotatably outward fitted to the main body portion 109a of the first shaft portion 108a and the main body portion 109b of the second shaft portion 108b via a bearing means.

Further, there is a shaft which is not joined (for example, patent document 1). The shaft mentioned above is called as a dumbbell type, as shown in FIG. 17. In other words, in this case, the shaft is constituted by supporting portions 113a and 113b in both end portions, and a large-diameter portion 114 in a center portion, and a peripheral groove 115 is formed in a center portion of the large-diameter portion 114 in an axial direction. Further, the roller 107 is rotatably outward fitted to the large-diameter portion 114 in the center portion via a bearing means.

Patent Document 1

Japanese Unexamined Utility Model Publication No. 5-45338 (page 1)

However, since the shaft is formed in a hollow shape in the case of using the shaft in FIG. 16, a weight saving can be achieved, however, it is necessary to join the first shaft portion 108a to the second shaft portion 108b. It is troublesome to manufacture such the shaft, and if there is a defect in the joint of the joining area, there is a risk that the first shaft portion 108a and the second shaft portion 108b are separated from each other at a time when a load is applied during use. Further, in the dumbbell type as shown in FIG. 17, it is possible to avoid a joining work, however, since the shaft is a so-called solid type, the weight is increased, and a cost thereof is increased accordingly. Further, in order to supply an oil to an oil reserving portion 116 formed between a roller inner peripheral surface and a shaft outer peripheral surface, it is necessary to form diametrical hole portions 118 and 118 communicated with an axial hole portion 117. The diametrical hole portions 118 and 118 reach an outer peripheral surface from an axis O and are comparatively long, and it is troublesome to work the diametrical hole portions 118 and 118.

SUMMARY OF THE INVENTION

The present invention is made in order to achieve the conventional defects mentioned above, and an object of the present invention is to provide a shaft for a roller wheel which is excellent in strength and can achieve a weight saving.

In accordance with a first aspect of the present invention, there is provided a shaft for a roller wheel which rotatably supports a roller outward fitted between both end portions in a state in which both end portions are fixed, and receives a load in a diametrical direction via the roller, wherein a recess portion is provided on a side to which the load is not applied, on an outer peripheral surface corresponding to the roller.

In the shaft for the roller wheel in accordance with the first aspect mentioned above, since the recess portion is provided on the outer peripheral surface, it is possible to lighten the weight of the shaft, it is easy to handle, and it is possible to reduce a manufacturing cost. Further, since the recess portion is provided on the side to which the load is not applied, it is possible to sufficiently achieve the strength required as the shaft even in the case that the shaft is under the load.

In accordance with a second aspect of the present invention, there is provided a shaft for a roller wheel, wherein the load applying direction is a vertical direction, and a cross sectional shape of the shaft in the recess portion is formed in a shape which is constituted by an upper circular arc portion on an upper side, a lower circular arc portion on a lower side, and a vertical connection portion passing through the shaft axis and connecting the upper circular arc portion to the lower circular arc portion.

In the shaft for the roller wheel in accordance with the second aspect mentioned above, since the cross sectional shape of the shaft in the recess portion is formed in the shape which is constituted by the upper circular arc portion in the upper side, the lower circular arc portion on the lower side, and the vertical connection portion connecting the upper circular arc portion to the lower circular arc portion, it is possible to form the roller wheel such as to leave a portion required for receiving the load, it is possible to widely reduce an entire weight, and it is possible to further reduce the manufacturing cost.

In accordance with a third aspect of the present invention, there is provided a shaft for a roller wheel, wherein the shaft cross sectional shape is vertically symmetrical with respect to the shaft axis.

In the shaft for the roller wheel in accordance with the third aspect mentioned above, since the shaft cross sectional shape is vertically symmetrical with respect to the shaft axis, it is easy to manufacture, it is possible to assemble the roller wheel using the shaft for the roller wheel in a crawler type traveling apparatus or the like without relation to a vertical attitude, and an excellent workability can be obtained. In accordance with a fourth aspect of the present invention, there is provided a shaft for a roller wheel, wherein a peripheral length of the recess portion is smaller on the end portion side in the axial direction than in the center portion in the axial direction.

In the shaft for the roller wheel in accordance with the fourth aspect mentioned above, since the peripheral length of the recess portion is smaller on the end portion side in the axial direction than in the center portion in the axial direction, it is possible to effectively prevent the strength of the supporting portion for the rotatably supported roller from being lowered. Accordingly, it is possible to receive the load applied from the roller in a stable state, an excellent durability is achieved, and it is possible to provide a shaft which can be stably used for a long time.

DESCRIPTION OF THE PREFERRED EMBODIMENTS

Figure 1:
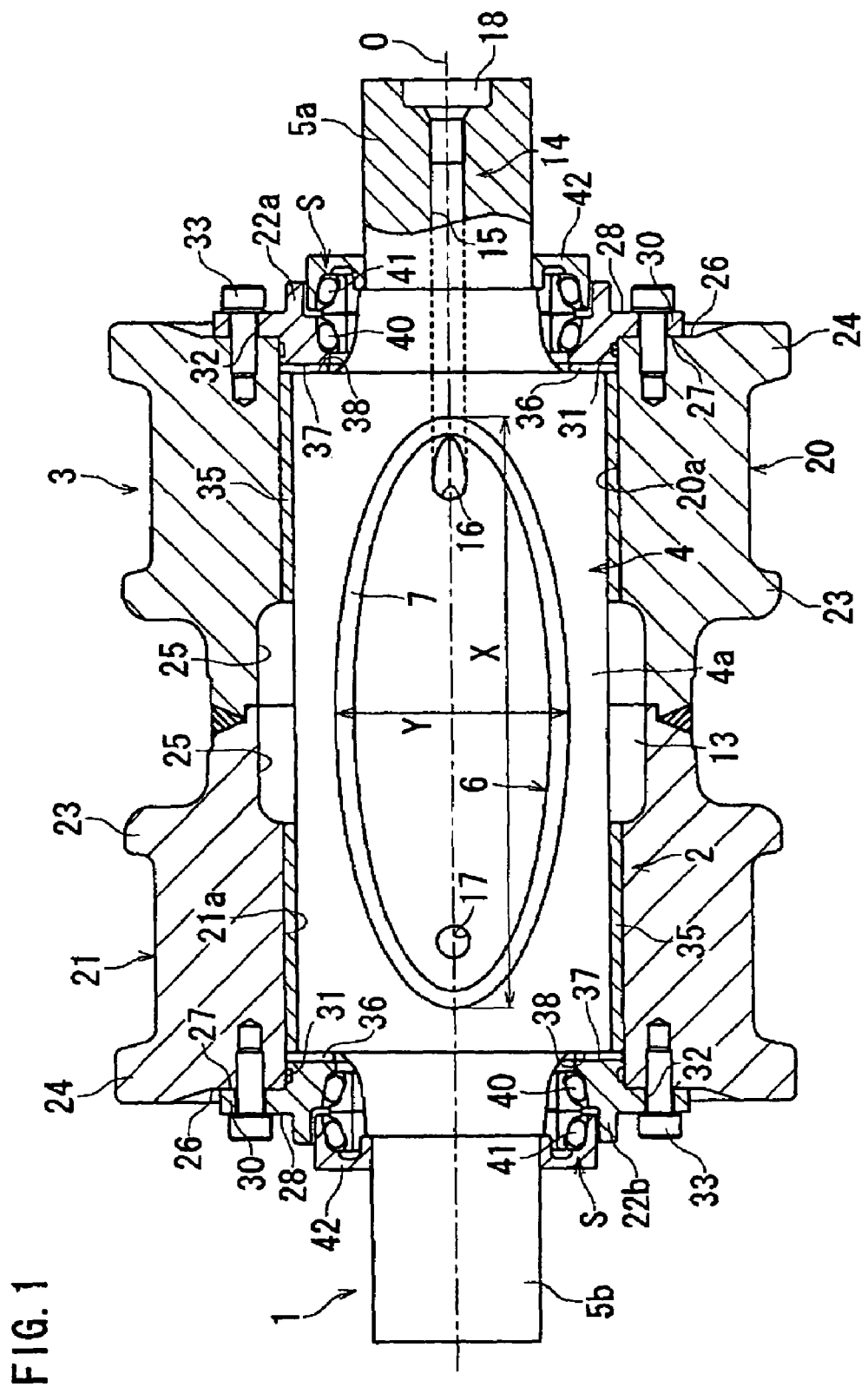
FIG. 1 is a side elevational view showing an embodiment of a shaft for a roller wheel in accordance with the present invention.
Figure 15:
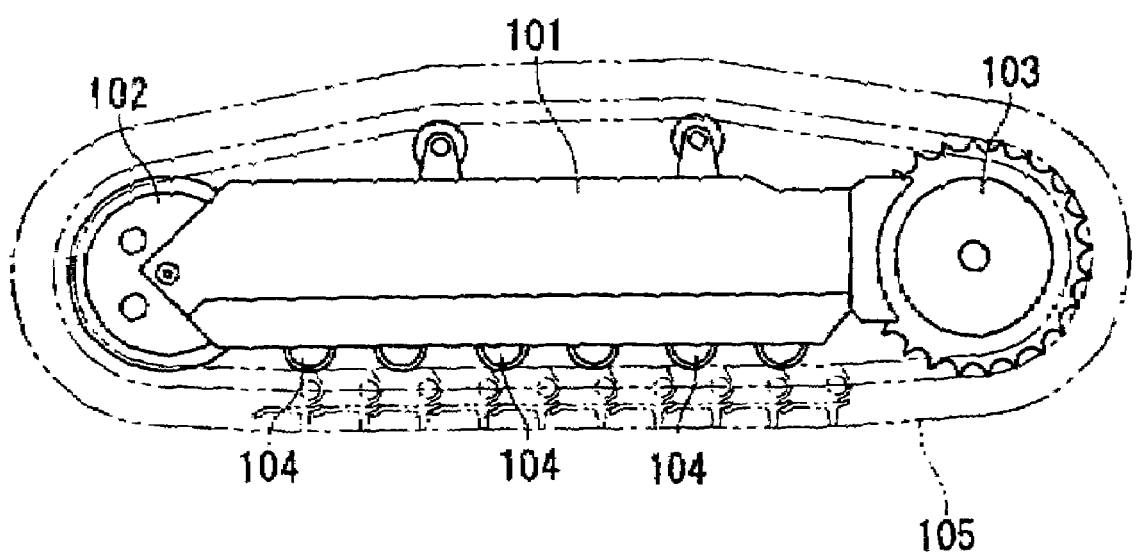
FIG. 15 is a brief view of a crawler type traveling apparatus.
Figure 16:
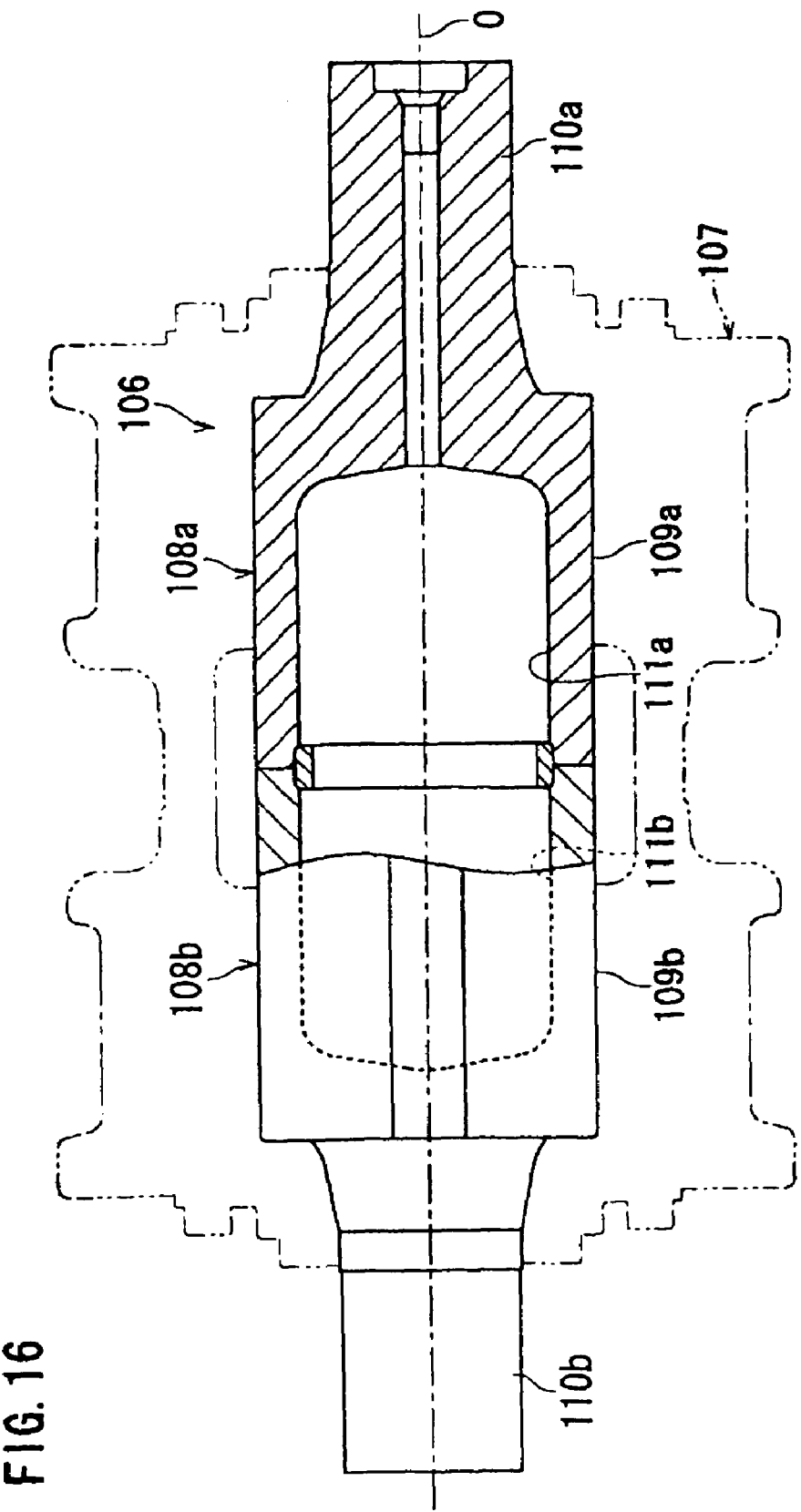
FIG. 16 is a side elevational view showing a conventional shaft for a roller wheel by using a partly cross section.
Figure 17:
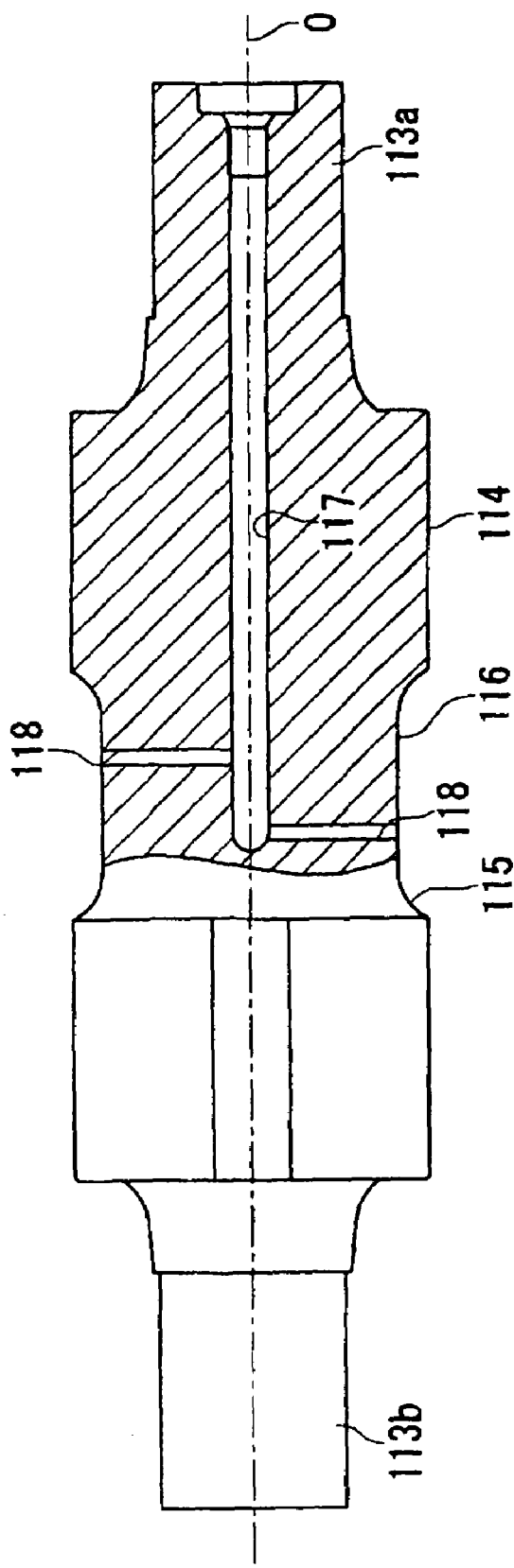
FIG. 17 is a side elevational view showing another conventional shaft for a roller wheel by using a partly cross section.

Next, a description will be given in detail of a specific embodiment of a shaft for a roller wheel in accordance with the present invention with reference to the accompanying drawings. FIG. 1 shows a roller wheel using the shaft for the roller wheel in accordance with the present invention. The roller wheel is used for a lower roller wheel of a crawler type traveling apparatus, for example, in a construction machine such as a bulldozer or the like and an agricultural machine such as a harvesting machine or the like. The crawler type traveling apparatus is structured, in the same manner as that of the conventional crawler type traveling machine in FIG. 15, such that an idler and a sprocket are arranged approximately linearly, a roller wheel (a lower roller wheel) is rotatably provided between the idler and the sprocket, and a crawler belt is wound around the idler, the roller wheel and the sprocket. The roller wheel is provided with a roller wheel shaft 1 in accordance with the present invention, and a roller 3 rotatably supported to the shaft 1 via a bearing means 2, as shown in FIG. 1. Further, seal apparatuses S and S are arranged in an outer side of the bearing means 2 (in an outer side in an axial direction of the shaft).

The roller wheel shaft 1 is constituted by a middle portion 4 to which the roller 3 is outward fitted, and end portions 5a and 5b protruded from the middle portion 4 and having a smaller diameter than that of the middle portion 4. The roller wheel shaft 1 is a fixed shaft in which the end portions 5a and 5b are mounted to a fixed side. Further, the middle portion 4 is provided with a pair of recess portions 6 and 6 at symmetrical positions with respect to a shaft axis O. The recess portion 6 is formed in an oval shape in a side view as shown in FIG. 1, and a peripheral length L (refer to FIGS. 3 to 6) thereof is set to be smaller on the end portion side in the axial direction than in the center portion in the axial direction. Further, the recess portion 6 is structured such that a long diameter X thereof is slightly shorter than an axial length of the middle portion 4, and a short diameter Y is slightly shorter than a diameter of the shaft. In this case, a chamfer portion 7 is provided in a peripheral edge portion of the recess portion 6.

Figure 2:
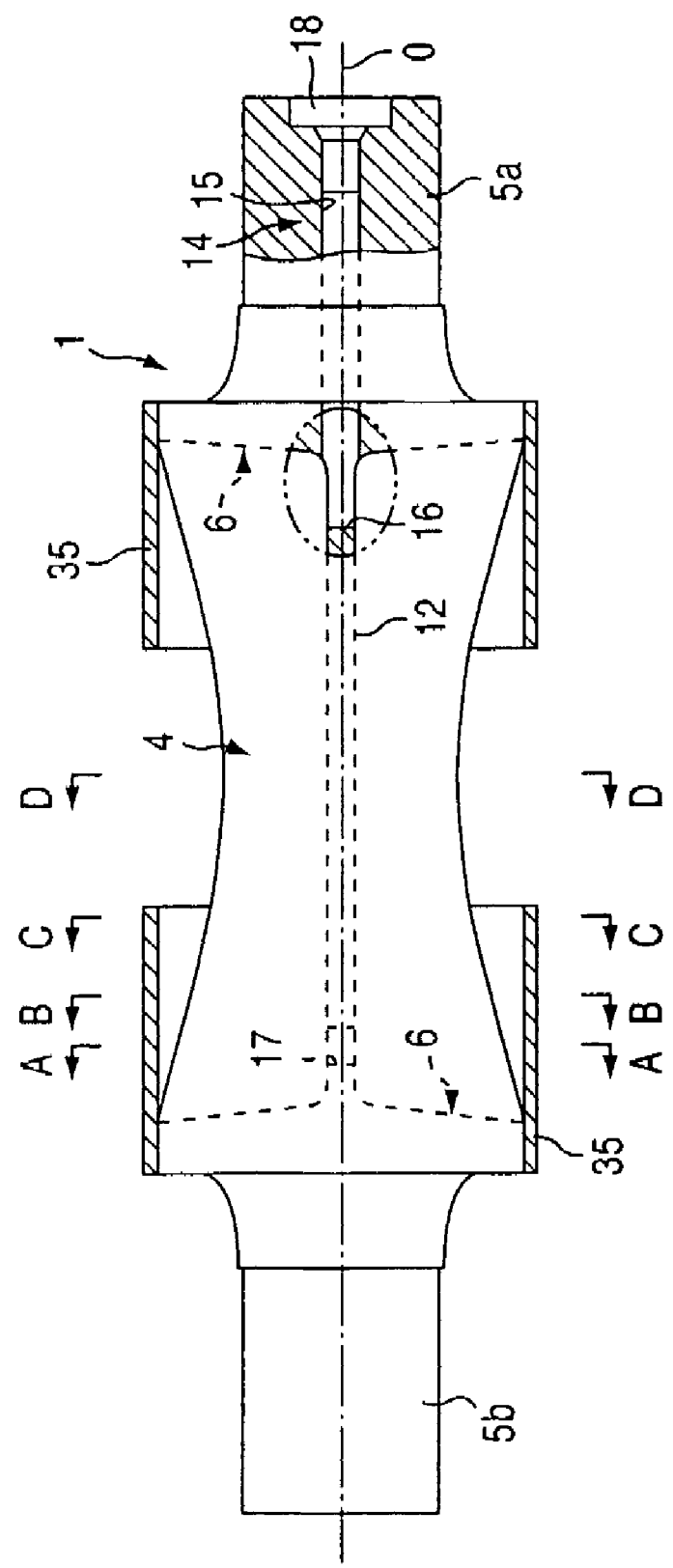
FIG. 2 is a plan view of the shaft for the roller wheel.
Figure 3:
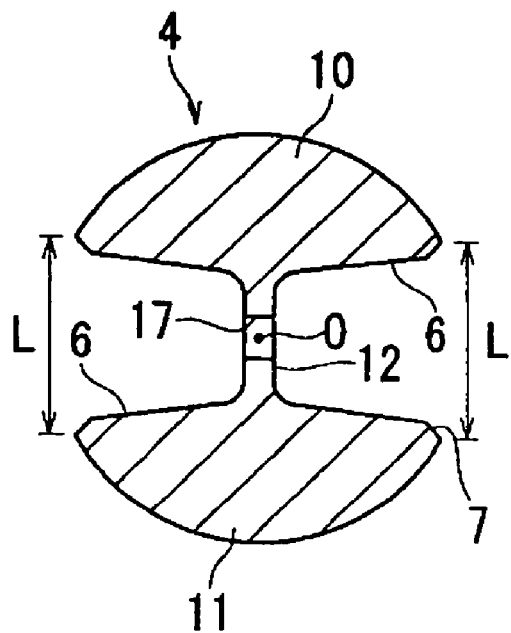
FIG. 3 is a cross sectional view along a line A—A in FIG. 2.
Figure 4:
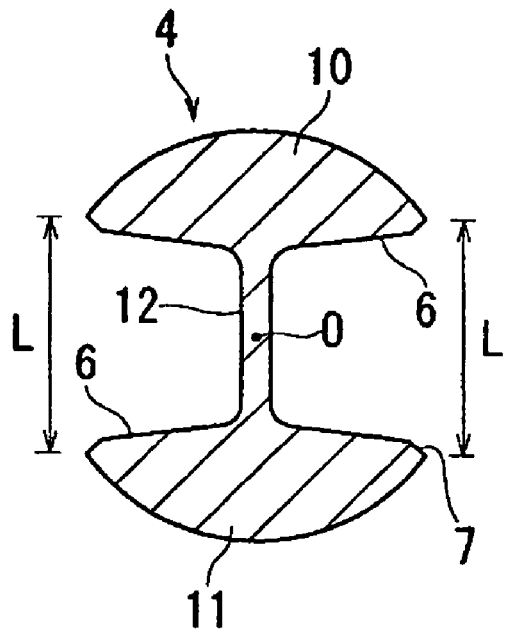
FIG. 4 is a cross sectional view along a line B—B in FIG. 2.
Figure 5:
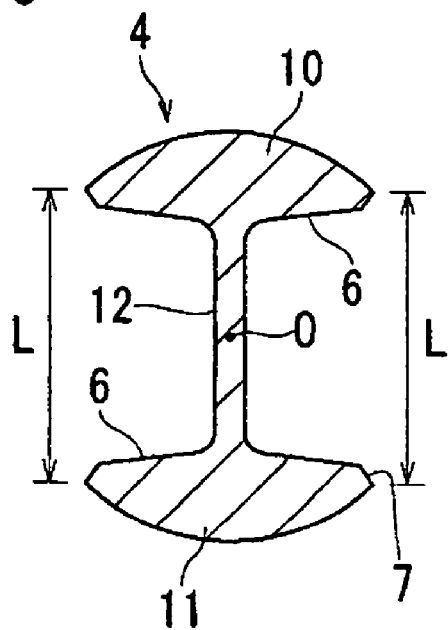
FIG. 5 is a cross sectional view along a line C—C in FIG. 2.
Figure 6:
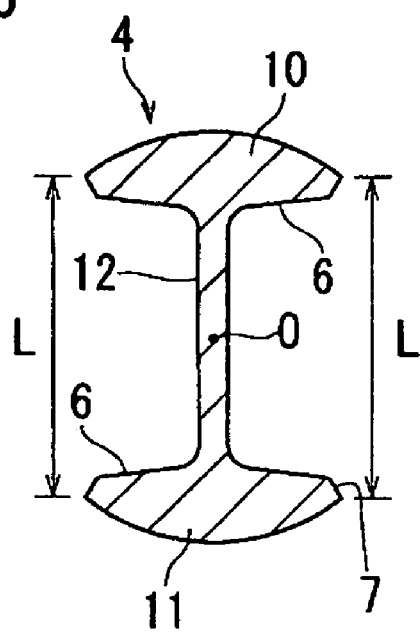
FIG. 6 is a cross sectional view along a line D—D in FIG. 2.

Further, a cross sectional shape of the shaft in the recess portions 6 and 6 is set to a shape as shown in FIGS. 3 to 6, that is, an approximately I shape. In other words, the shaft cross sectional shape mentioned above is constituted by an upper circular arc portion 10 on an upper side, a lower circular arc portion 11 on a lower side, and a connection portion 12 connecting them. In this case, the connection portion 12 extends in a vertical direction so as to pass through the shaft axis O, and connects the upper circular arc portion 10 to the lower circular arc portion 11. Accordingly, the shaft cross sectional shape is vertically symmetrical with respect to the shaft axis O. Further, since the peripheral length L of the recess portion 6 is set such as to be shorter on the end portion side in the axial direction than in the center portion in the axial direction, the vertical length of the connection portion 12 is changed sequentially, as shown in FIG. 3 showing a cross section along a line A—A in FIG. 2, FIG. 4 showing a cross section along a line B—B in FIG. 2, FIG. 5 showing a cross section along a line C—C in FIG. 2, and FIG. 6 showing a cross section along a line D—D in FIG. 2.

Further, the shaft 1 is provided with a supply passage 14 for supplying an oil to an oil reserving portion 13 formed between the roller 3 and the shaft 1, as shown in FIGS. 1 and 2, that is, provided with an axial hole portion 15 extending along the shaft axis O open to an end surface of one end portion 5a, and provided with a first through hole 16 close to the one end portion 5a and a second through hole 17 close to the another end portion 5b, in the connection portion 12 mentioned above. Further, the first through hole 16 close to the one end portion 5a is communicated with the axial hole portion 15. Accordingly, the oil injected into the axial hole portion 15 is supplied to both (right and left) recess portions 6 and 6 from the axial hole portion 15 via the first through hole 16, and is supplied to the oil reserving portion 13 from the recess portions 6 and 6. Further, since both the recess portions 6 and 6 are communicated with each other by the second through hole 17, the oil is supplied uniformly to both the recess portions 6 and 6 by the second through hole 17 and the first through hole 16. In this case, a plug member 18 is attached to the opening portion of the axial hole portion 15 after the oil is injected.

In this case, the roller 3 is constituted by a first half body 20 and a second half body 21, and is supported to the shaft 1 by supporting members 22a and 22b mounted to both end sides. In other words, each of the half bodies 20 and 21 has an inner collar portion 23 and an outer collar portion 24 in an outer peripheral surface thereof, and a peripheral groove 25 in an inner peripheral surface thereof. The oil reserving portion 13 is formed in the peripheral grooves 25 and 25. Further, recess portions 26 and 26 are provided in outer end surfaces of the respective half bodies 20 and 21, and the supporting members 22a and 22b are fitted to the respective recess portions 26 and 26.

In this case, the supporting members 22a and 22b have peripheral notch portions 27 and 28 in an inner side and an outer side in an axial direction of the outer peripheral surface, and a collar portion 30 is formed by the notch portions 27 and 28. Further, inner diameter portions 31 and 31 of the recess portions 26 and 26 in the respective half portions 20 and 21 are fitted to the respective peripheral notch portions 27 and 27 in the inner side. Further, a plurality of hole portions 32, . . . arranged along a peripheral direction are provided in the collar portion 30, and bolt members 33, . . . inserted to the hole portions 32, . . . are screwed with threaded holes of the respective half bodies 20 and 21. Accordingly, the middle portion 4 of the shaft 1 is clamped by both the supporting members 22a and 22b, and the roller 3 is attached to the shaft 1. At this time, bushes 35 and 35 are interposed between the inner peripheral surfaces 20a and 21a of the respective half bodies 20 and 21, and the outer peripheral surface of the shaft 1 (specifically, the outer peripheral surface 4a of the middle portion 4), and thrust pads 36 and 36 are interposed between inner end surfaces 37 and 37 of both the supporting members 22a and 22b, and end surfaces 38 and 38 of the middle portion 4 of the shaft 1. In other words, the bearing means 2 mentioned above is structured by the bush 35 and the thrust pad 36. Accordingly, the inner end surfaces 37 and 37 of both the supporting members 22a and 22b press the end surfaces 38 and 38 against the middle portion 4 of the shaft 1 via the thrust pads 36 and 36 to an inner side in the axial direction, by fastening the bolt members 33, . . . of both the supporting members 22a and 22b, and the roller 3 to which both the supporting members 22a and 22b are attached is rotatably supported to the shaft 1 in a state in which the roller 3 is outward fitted in the middle portion 4 of the shaft 1.

Further, seal apparatuses S and S constituted by a floating ring seal are arranged in an inner diameter side of the supporting members 22a and 22b. In other words, the respective floating ring seals are provided with rotating side members 40 and 40 and fixed side members 41 and 41. In this case, the respective rotating side members 40 and 40 are supported to the supporting members 22a and 22b, and the respective fixed side members 41 and 41 are received by seal supporting bodies 42 and 42 firmly fixed to the end portions 5a and 5b of the shaft 1.

The shaft 1 structured in the manner mentioned above is used for the lower roller wheel, and is exposed to a load in a diametrical direction (a load in a vertical direction) applied from the roller 3. Accordingly, the recess portions 6 and 6 formed on the outer peripheral surface of the shaft 1 (the outer peripheral surface 4a of the middle portion 4 corresponding to the roller 3) are formed on a side to which the load is not applied in a direction approximately orthogonal to a load applying direction. In this case, since a cross sectional shape in the recess portions 6 and 6 is an approximately I shape, and the connection portion 12 in the vertical direction is arranged along the load applying direction, a bending strength in the vertical direction (the vertical direction) is great, and it is possible to achieve a sufficient strength required as the shaft 1. Further, a weight saving can be achieved at an amount that the recess portions 6 and 6 are formed, in comparison with the solid shaft. In other words, the weight saving can be achieved except the roller slide portions in the upper portion (the upper circular arc portion 10) and the lower portion (the lower circular arc portion 11) which are required for receiving the load required for the roller wheel shaft, and the connection portion 12 connecting them. Further, on the basis of the weight saving, it is easy to handle the shaft and it is possible to reduce a manufacturing cost.

Further, since the cross sectional shape of the shaft is the vertically symmetrical shape with respect to the shaft axis O, it is easy to manufacture the shaft, it is possible to assemble the roller wheel using the roller wheel shaft in the crawler type traveling apparatus or the like without relation to the vertical attitude, and an excellent workability can be obtained. Further, since the peripheral length L of the recess portion 6 is made smaller on the end portion side in the axial direction than in the center. portion in the axial direction, it is possible to effectively prevent the strength of the supporting portion for the rotatably supported roller 3 from being lowered. Accordingly, it is possible to receive the load applied from the roller 3 in a stable state, and it is possible to provide a shaft which is excellent in durability and can be stably used for a long time. Further, since the oil is supplied to the recess portion 6 from the supply passage 14, it is possible to keep a sufficient amount of oil between the shaft 1 and the roller 3, and it is possible to achieve a smooth rotation of the roller 3. Further, since the first through hole 16 and the second through hole 17 which communicate the right and left recess portions 6 and 6 are formed in the connection portion 12, it is possible to make a length thereof short, and it is possible to simply form.

Figure 7:
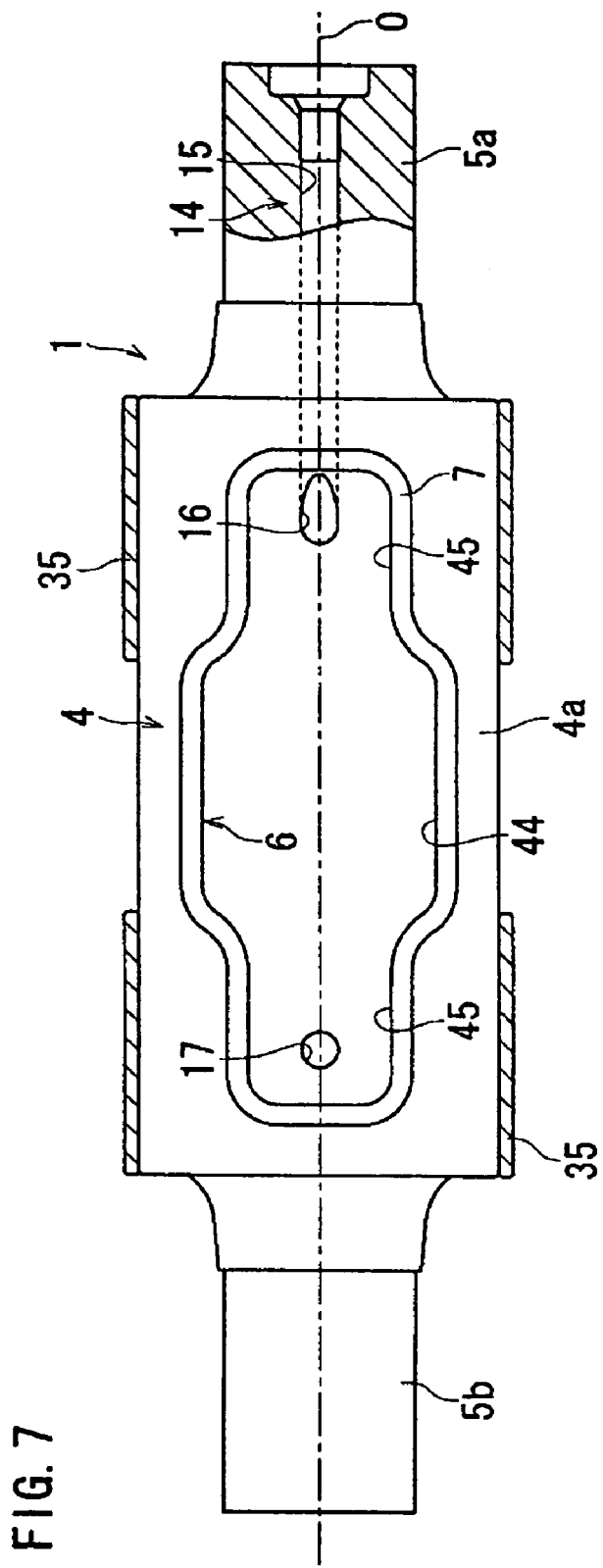
FIG. 7 is a side elevational view showing another embodiment of a shaft for a roller wheel in accordance with the present invention.
Figure 8:
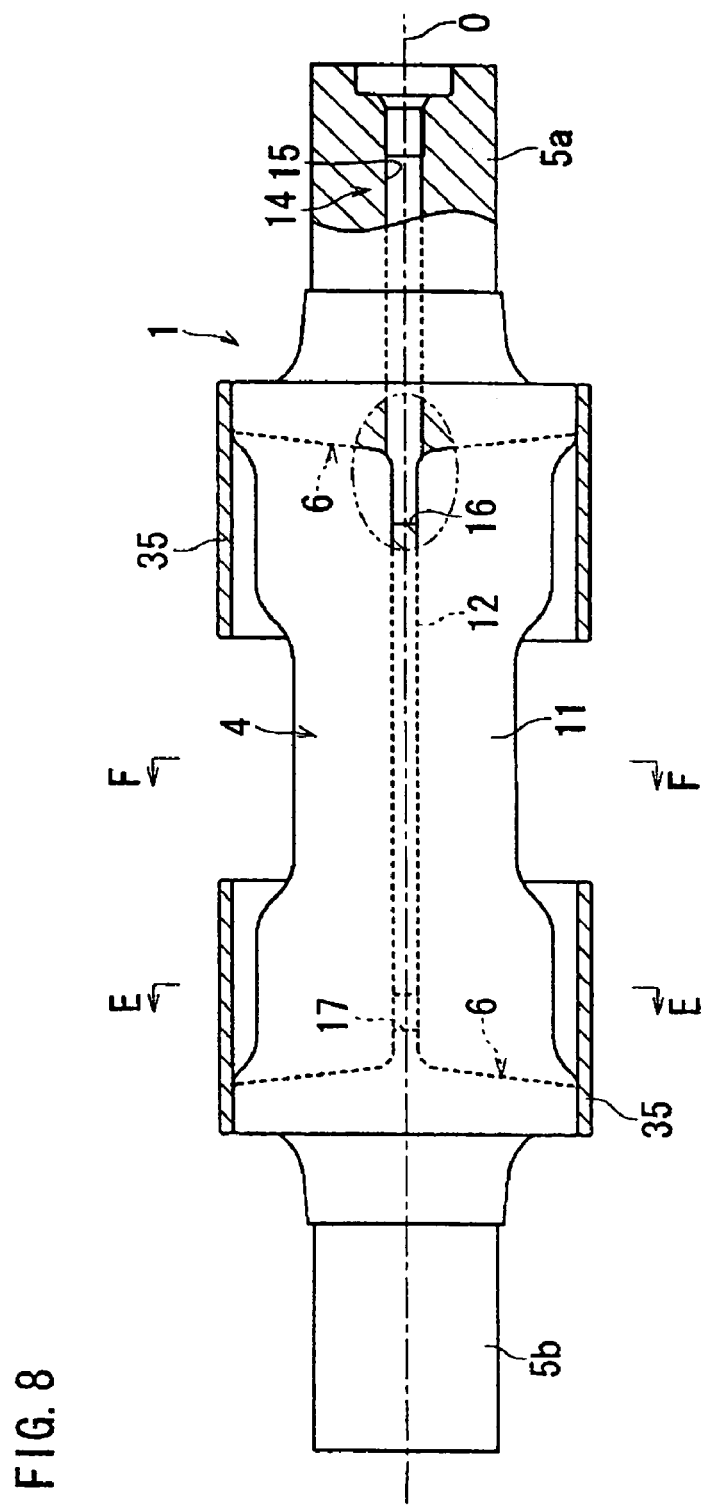
FIG. 8 is a plan view of the shaft for the roller wheel.
Figure 9:
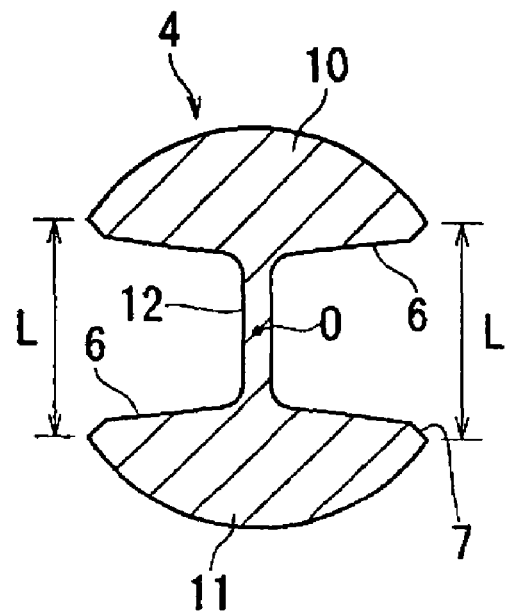
FIG. 9 is a cross sectional view along a line E—E in FIG. 8.
Figure 10:
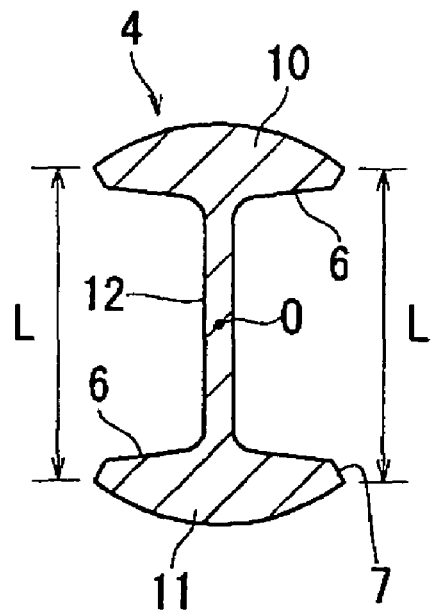
FIG. 10 is a cross sectional view along a line F—F in FIG. 8.

Next, FIGS. 7 and 8 show another embodiment. In this case, the recess portion 6 is constituted by a center portion 44 in which a peripheral dimension is large, and end portions 45 and 45 in which a peripheral dimension is shorter than that of the center portion. Even in this case, a cross sectional shape of the shaft in the recess portions 6 and 6 is set to an approximately I shape, as shown in FIGS. 9 and 10. In other words, the cross sectional shape of the shaft mentioned above is constituted by the upper circular arc portion 10 on the upper side, the lower circular arc portion 11 on the lower side, and the connection portion 12 connecting them. Further, since the peripheral length L of the recess portion 6 is smaller on the end portion side in the axial direction than in the center portion in the axial direction, the vertical length of the connection portion 12 is sequentially changed, as shown in FIG. 9 showing a cross section along a line E—E in FIG. 8, and FIG. 10 showing a cross section along a line F—F in FIG. 8. In this case, since the other structures are the same as those of the shaft shown in FIGS. 1 and 2, the same reference numerals are attached and a description thereof will be omitted.

Accordingly, in the shaft shown in FIGS. 7 and 8, the weight saving can be achieved except the roller slide portions in the upper portion (the upper circular arc portion 10) and the lower portion (the lower circular arc portion 11) which are required for receiving the load required for the roller wheel shaft, and the connection portion 12 connecting them. Accordingly, it is possible to achieve the same operations and effects as those of the shaft shown in FIGS. 1 and 2.

Figure 11:
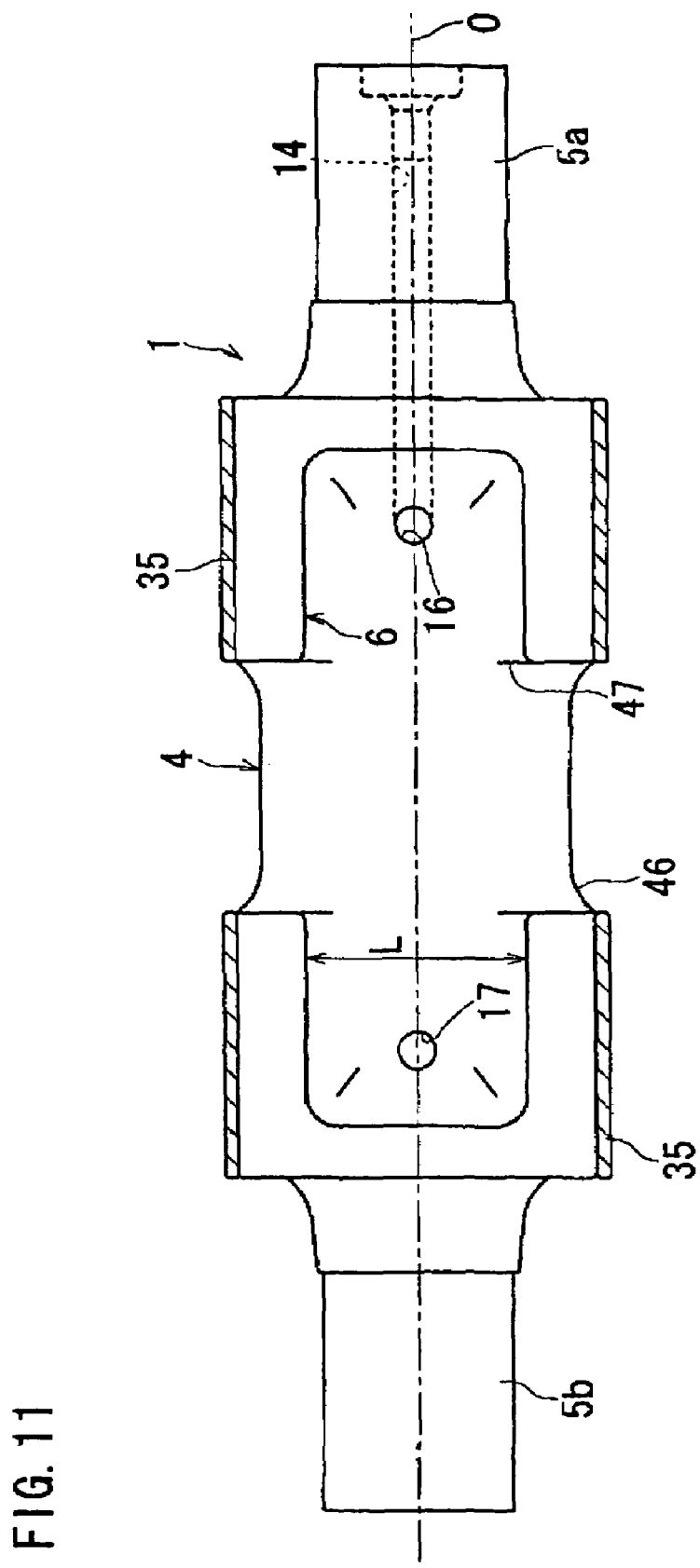
FIG. 11 is a side elevational view showing yet another embodiment of a shaft for a roller wheel in accordance with the present invention.
Figure 12:
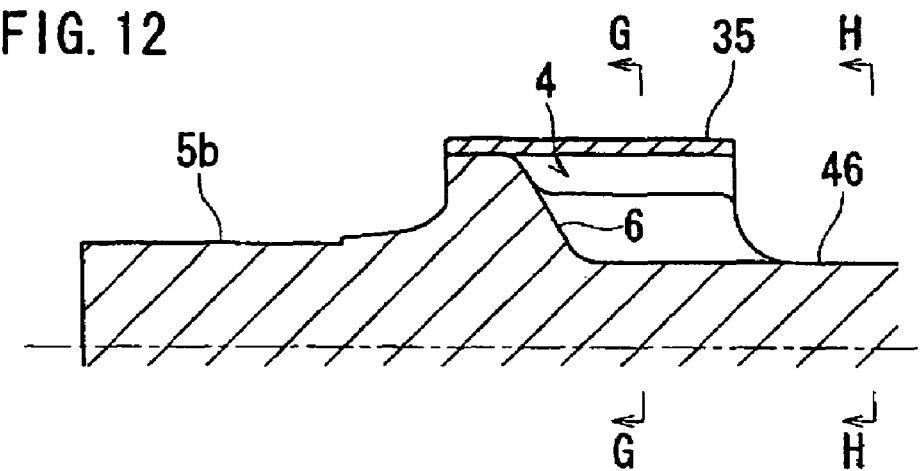
FIG. 12 is a plan view of a cross section of the shaft for the roller wheel.
Figure 13:
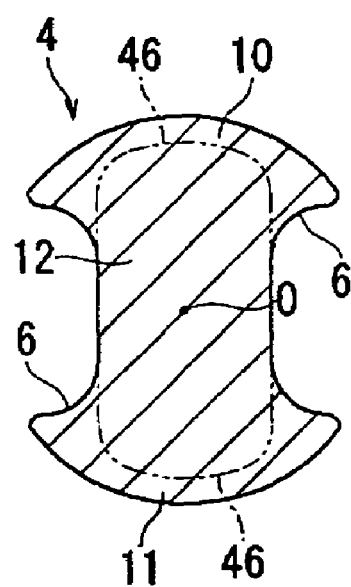
FIG. 13 is a cross sectional view along a line G—G in FIG. 12.
Figure 14:
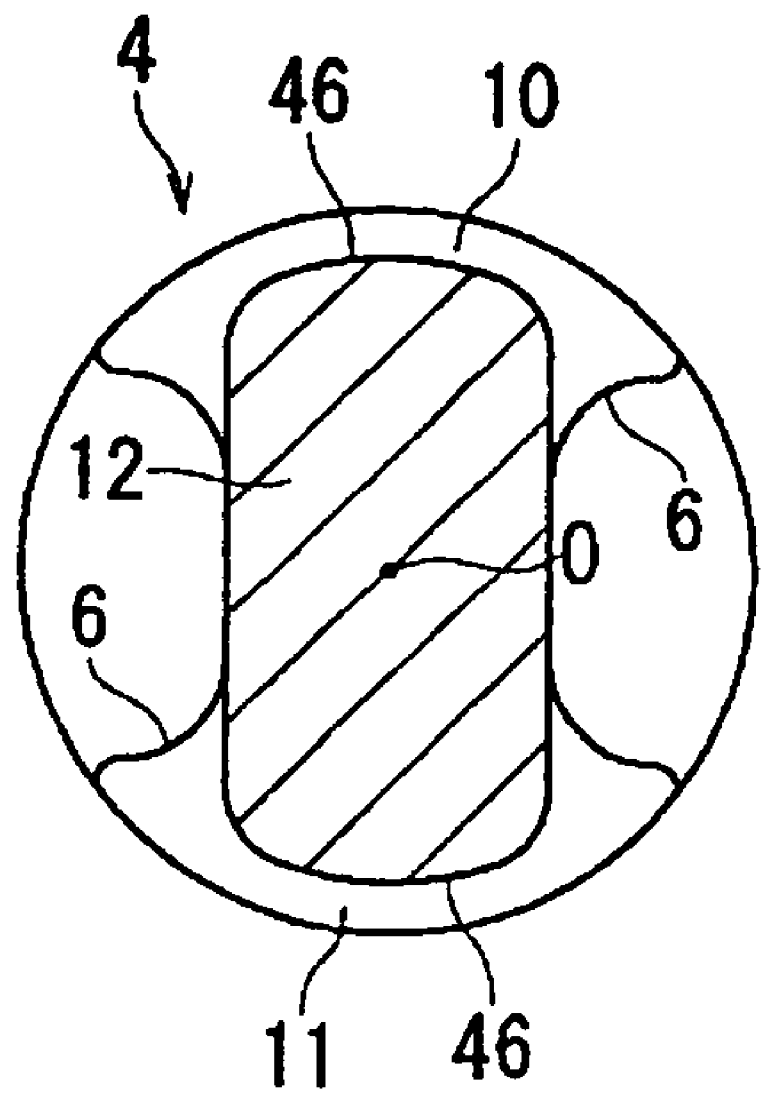
FIG. 14 is a cross sectional view along a line H—H in FIG. 12.

Next, FIG. 11 shows yet another embodiment. In this case, the recess portion 6 is formed on a side to which the load is not applied, in a direction approximately orthogonal to the load applying direction (the vertical direction) of the shaft 1, and a recess portion 46 is also formed in the load applying direction. In other words, as is known from FIG. 12 showing a cross sectional plan view, FIG. 13 showing a cross section along a line G—G in FIG. 12, and FIG. 14 showing a cross section along a line H—H in FIG. 12, the recess portions 46 and 46 communicated with a pair of recess portions 6 and 6 are provided in a center portion of the middle portion 4 of the shaft 1. Accordingly, as shown in FIG. 11 and the like, a peripheral recess groove 47 is formed in the center portion in the axial direction of the shaft 1. This is because it is not necessary that all the surfaces in the load applying direction of the shaft 1 are exposed to the load applied from the roller 3. The recess portion 46 is provided in a portion which does not correspond to the bush 35 (the outer peripheral surface of the shaft 1 in the load applying direction to which the load is not applied, and the outer peripheral surface being arranged in the load applying direction of the center portion in the axial direction). In this case, the recess portion 6 is formed in an approximately rectangular shape in a side view, as is known from FIG. 11, whereby the peripheral length L of the recess portion 6 does not change along the axial direction of the shaft. In this case, in FIGS. 11 to 14, the same reference numerals are attached to the same portions as those of the shaft shown in FIG. 1 or 7, and a description thereof will be omitted.

Accordingly, in the shaft shown in FIGS. 11 to 14, the recess portion 6 is provided on the side to which the load is not applied, on the outer peripheral surface corresponding to the roller 3, and the recess portion 46 is provided in the portion to which the load is not applied, on the load applying side. Accordingly, in the structure in which a thickness (a wall thickness) of the connection portion 12 is made larger than that of the shaft 1 shown in FIG. 1 or 7, a weight saving can be achieved.

The description is given of the specific embodiments of the roller wheel shaft in accordance with the present invention, however, the present invention is not limited to the embodiments mentioned above, and can be carried out by variously modifying within the scope of the present invention. For example, the peripheral length of the upper circular arc portion 10 may be made shorter than the peripheral length of the lower circular arc portion 11, or the peripheral length of the lower circular arc portion 11 may be inversely made shorter than the peripheral length of the upper circular arc portion 10. In other words, the cross sectional shape in the recess portion 6 is not necessarily symmetrical with respect to the axis. Further, there is a case that the roller wheel shaft is arranged in a portion in which the load applying direction is not the vertical direction. In this case, it is preferable to arrange the circular arc portions 10 and 11 along the load applying direction, and arrange the recess portion 6 in a direction approximately orthogonal to the load applying direction. In other words, the recess portion 6 may be arranged on a different surface from the surface to which the maximum load is applied. Further, the thickness (the wall thickness) of the connection portion 12 can be optionally set on the basis of a range of preventing the connection portion from being bent in a lateral direction during the use due to its too thin thickness, and preventing the weight saving from being hardly achieved due to its too thick thickness. Further, in the embodiments mentioned above, a pair of right and left recess portions 6 are provided, however, only one recess portion may be provided. Further, the cross sectional shape of the recess portion 6 is not limited to the rectangular shape, and may be an approximately V shape sequentially expanding in an outer diameter direction, and the like. Further, in the shaft shown in FIG. 1 or 7, the peripheral length L of the recess portion 6 may not be changed along the shaft axial direction, and in the shaft 1 shown in FIG. 11, the peripheral length L of the recess portion 6 may be changed along the shaft axial direction, in the same manner as that of the shaft 1 shown in FIG. 1 or 7.

What is claimed is:

1. A shaft for rotatably supporting a roller wheel, the shaft comprising:
    end portions having the roller fitted therebetween; and
    a middle portion having the roller fitted thereon, the middle portion having a connection portion that extends along a diametrical direction of the shaft and further having recess portions at symmetrical positions with respect to a shaft axis,
    wherein the shaft receives a load from the roller along the diametrical direction of the shaft, and
    wherein the cross-section of the middle portion of the shaft includes an upper portion and a lower portion each of which receives the load from the roller, and the connection portion connecting the upper and lower portions.

2. The shaft as in claim 1, wherein the diametrical direction to which the shaft receives the load from the roller is a vertical direction, and wherein the connection portion extends vertically and passes through the shaft axis.

3. The shaft as in claim 1, wherein each of the recess portions of the middle portion of the shaft has an opening that extends horizontally from the vertically extending connection portion, the opening becoming smaller as it extends toward the end portions of the shaft.

* * * * *